March 14, 1933. E. H. SNOW 1,901,614
INCUBATOR
Filed Feb. 24, 1930
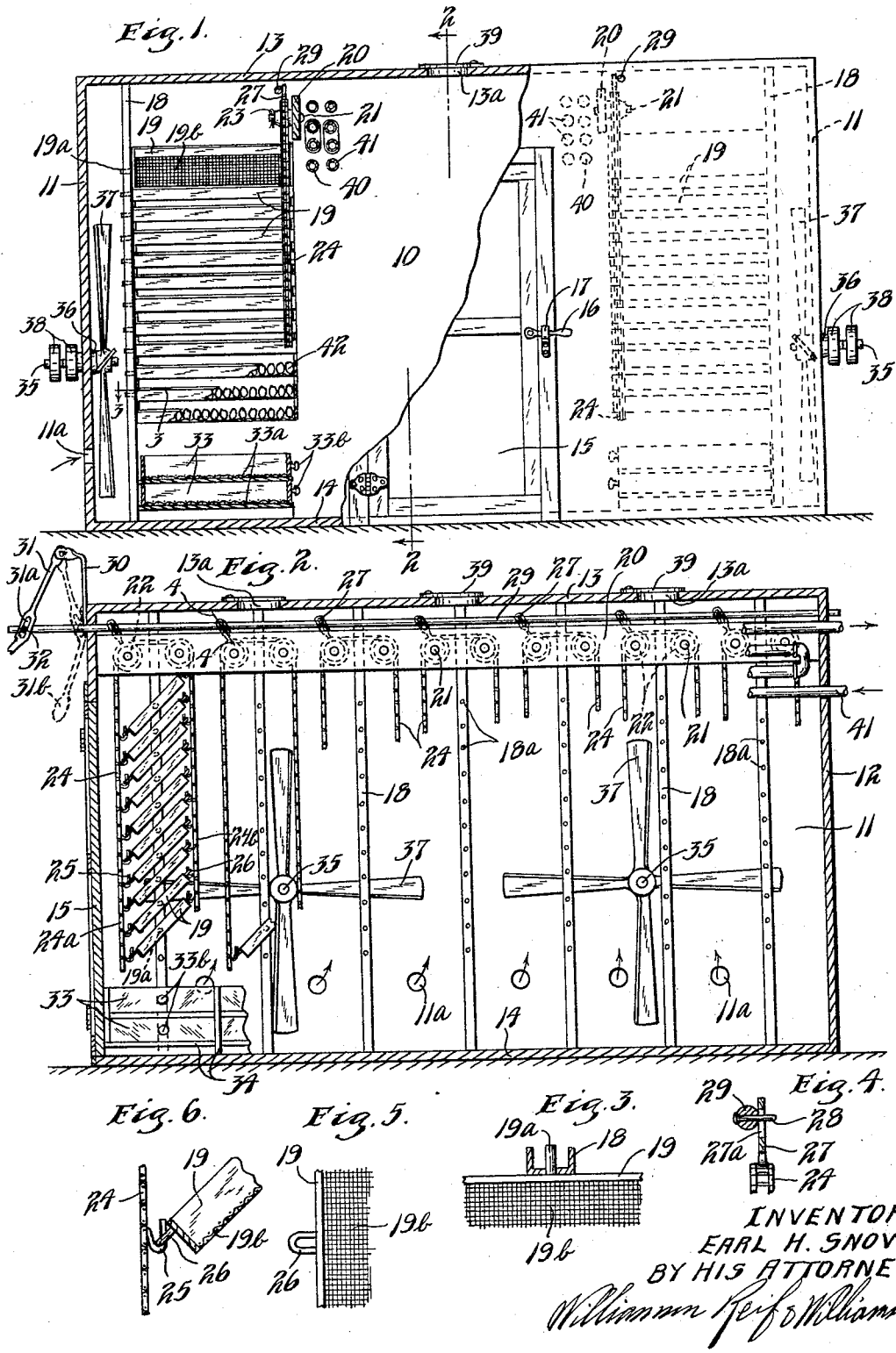
INVENTOR.
EARL H. SNOW.
BY HIS ATTORNEYS Patented Mar. 14, 1933

1,901,614

UNITED STATES PATENT OFFICE

EARL H. SNOW, OF SLEEPY EYE, MINNESOTA

INCUBATOR

Application filed February 24, 1930. Serial No. 430,508.

This invention relates to an incubator and particularly to an incubator of the type comprising a chamber of large dimensions and adapted to contain a large number of eggs, which eggs are disposed in separate trays arranged in tiers. It is desirable in such an incubator to have the trays arranged so that they are conveniently accessible so that they can readily be placed in operating position and removed therefrom and to have a simple and easily operable means for tilting the trays. It is also desirable in such an incubator to have some means for constantly agitating the air and for maintaining the same at the desired temperature.

It is an object of this invention, therefore, to provide a simple and efficient structure of incubator having means at each side cooperating to constantly agitate the air in the incubator.

It is a further object of the invention to provide an incubator comprising a substantially rectangular chamber having air inlet openings in the side walls thereof and having tiers of egg-containing trays at either side thereof and comparatively large slow-speed fans disposed adjacent the sides of the chamber adapted to draw a certain amount of air in said inlet openings and keep the entire body of air within the chamber in motion.

These and other objects and advantages of the invention will be fully set forth in the following description made in connection with the accompanying drawing, in which like reference characters refer to similar parts throughout the several views, and in which:—

Fig. 1 is a view in front elevation of the incubator, a portion being broken away and other portions shown in vertical section;

Fig. 2 is a vertical section taken on line 2—2 of Fig. 1 as indicated by the arrows;

Fig. 3 is a section taken on line 3—3 of Fig. 1 as indicated by the arrows;

Fig. 4 is a section taken on line 4—4 of Fig. 2 as indicated by the arrows;

Fig. 5 is a top plan view of and end portion of one of the trays used, and

Fig. 6 is a fragmentary view showing the connection of the trays to the supporting chains, the tray being shown in vertical section.

Referring to the drawing, an incubator is shown comprising a chamber 10 having side walls 11, end walls 12, top 13 and floor or bottom 14. A door 15 is shown as leading into one end of the chamber, which door is illustrated as having a latch 16 engaging a keeper 17. The side walls 11 are each provided with a series of openings 11a, shown as circular in form and disposed somewhat adjacent the bottom 14. A plurality of vertical bars 18 are provided and while these bars may be of any desired form, in the embodiment of the invention illustrated they are shown as in the form of channels. Bars 18 extend from the floor 14 to the top 13 and are provided with a plurality of vertically spaced holes 18a. The holes 18a are adapted to receive trunnions 19a projecting centrally from one end of trays 19 arranged in a vertical row or tier along each of the bars 18. The trays 19 are rectangular in form and are of shallow depth and provided with screen bottoms 19b, said trays extending inwardly toward the center of the chamber from the bars 18. A supporting means 20 is shown in the form of a bar or timber extending longitudinally of the chamber 10 adjacent the top 13, the same being shown as in the form of a board having its flat side vertical. A plurality of stub shafts 21 extend through and are supported in member 20 each of which has journaled thereon a sprocket wheel 22, said sprockets being held on the shafts 21 by small collars 23 pinned thereto. The sprockets 22 are arranged in pairs disposed equal distances at each side of a vertical plane passing through the centers of holes 18a and a chain 24 runs over each of said pairs of sprockets, the same having depending spaced portions 24a and 24b. Said portions 24a and 24b have hooks 25 secured to the links thereof in any suitable manner and trays 19 have staples or eyelets 26 at each side thereof adjacent their inner ends which respectively engage in the hooks 25. The trays 19 are thus supported at one end on the chains 24 and at their other ends in the bars 18. The chains 24 each have connected thereto in their upper run which passes between sprockets 22 a link 27 which has a slot 27a therein. A pin 28 extends into each slot 27a, said pins being connected to a rod 29 extending longitudinally of chamber 10 slightly above and at one side of member 20, said rod being supported in the end walls 12 and extending some distance beyond the front wall. A bracket 30 is supported on the end wall 11 adjacent each rod 29, said bracket extending some distance above top 13 and having an outwardly bent arm to which is pivoted a lever 31. Lever 31 has a slot 31a therein receiving a pin 32 projecting from rod 29, said lever also having a lower handle portion 31b. It will be seen that by swinging lever 31, the rod 29 can be reciprocated. A pair of trays 33 in the form of drawers are supported below each of the tiers of trays 19, said drawers being supported in a suitable framework 34 and being shown as having screen bottoms 33a and handle knobs 33b, said knobs being at their inner ends. A pair of shafts 35 are journaled in suitable bearings 36 secured in the side walls 11 some distance above the holes 11a and fans 37 are secured to the inner ends of said shafts, said fans thus being in a plane closely adjacent the side walls 11 and between the same and the outer ends of the trays and members 18. Each shaft has secured thereto without the end wall 11 a pulley 38, one of said shafts being longer than the other so that said pulleys are laterally spaced. It will be noted that the fans 37 have comparatively long blades which blades are few in number, only four preferably being used. The chamber 10 has a series of outlet openings 13a in the top 13 which extend in longitudinal spaced relation substantially at the center of the chamber, each of said openings being controlled by swinging a pivoted damper 39. Rows of vertically spaced pipes 40 connected to form a continuous coil are disposed adjacent the inner side of member 20 and are adapted to receive some heating fluid, such as hot water or steam. A similar row of pipes 41 also connected to form a coil are shown and adapted to receive some cooling medium, such as cold air or a cooling fluid.

In operation, the eggs 42 will be placed in the trays 19, said eggs usually being placed in vertical position and in contact with each other. Pulleys 38 will be driven by belts running to a suitable motor and fans 37 will be rotated at a comparatively slow speed. In one embodiment of the invention the fan blades have been about four inches wide at their outer ends and the diameter of the fans about 63 inches. The fans draw small quantities of fresh air into the cabinet through the openings 11a, but the chief function of the fans is to constantly agitate all the air within the cabinet. By actual tests it is found that the air agitated by the fans follows no definite path of circulation throughout the cabinet. However, the air throughout the entire cabinet is kept in constant agitation by the fans. At certain points between the trays, the air travels at one time in one direction and at other points the air travels in another direction, and at other times the air seems to flow in different directions at the same points. Likewise in the corridor or central portion of the cabinet between the tiers of trays, tests show that there is no general circulation of air in any definite direction, but that there is a general agitation of all the air in the corridor. The fans 37 at one side of the cabinet supplement the action of the fans 37 at the other side of the cabinet to maintain the entire body of air within the cabinet in a constant state of agitation, and as a result, at all points in the cabinet the air is constantly being mixed and is of the same temperature and humidity. A portion of the air from the cabinet works its way out through the outlet openings 13a due to the slight increase in pressure within the cabinet relative to atmospheric pressure, by reason of the fact that the fans 37 constantly draw into the cabinet small quantities of fresh air. The air within the cabinet is thus kept from getting stale. By adjustment of the dampers 39, the quantity of fresh air admitted and the quantity of agitated air exhausted from the cabinet can be regulated to most effectively operate the incubator and maintain the air therein at the desired degree of freshness without waste of warmed or cooled air. The air within the cabinet is kept at the proper temperature by either the heating pipes 40 or by the cooling pipes 41. As is well known, the eggs must be changed in their position at certain intervals. In the present invention this is done by moving lever 31 which moves rod 29, said rod in turn swinging the links 27. The links pull upon the chains 24 causing them to move over the sprockets 22 and the depending portions 24a and 24b of the chains thus move in opposite directions. There is sufficient movement of the chains to cause the trays 19 to stand at opposite angles of substantially 45 degrees to the vertical when in their opposite positions. It will thus be seen that the trays can all be simultaneously moved with the operator standing in one position, the trays swinging about their trunnions 19a. The trays 19 can be readily disengaged from the chains and moved from one position to another if desired. By reason of the constant agitation of the air within the cabinet, the temperature and humidity of the air about all the trays is the same and it is, therefore, not necessary to lower the trays from an upper to a lower position during advanced stages of incubation of the eggs, as in some incubators. The trays 33 at the bottom are for the young chicks which are hatching or have just been hatched. The trays are all quite accessible from the central portion of the chamber 10, which chamber as clearly shown is open at its central portion.

From the above description it is seen that applicant has provided a very simple and efficient structure of incubator. The trays are compactly arranged and yet can be easily and quickly placed in position or removed and the trays are so supported as to be very easily changed in their position. The air in the cabinet is effectively agitated and a uniform temperature is maintained in all portions of the cabinet. The device has been amply demonstrated in actual practice and found to be very successful and efficient.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. An incubator having in combination, a substantially rectangular chamber, a plurality of tiers of superposed spaced egg-containing trays along each side of said chamber leaving an open space at the central portion of said chamber, said chamber having a series of inlet openings in the side walls thereof at the lower portion of said walls and a pair of fans of comparatively large diameter between said trays and said side walls constructed and arranged to draw air in said openings and direct it between said trays, a row of pipes for containing a heating medium and a row of pipes for containing a cooling medium at each side of said chamber adjacent the top and the inner ends of said trays, said chamber having spaced outlet openings in the top thereof between said pipes at either side thereof.

2. An incubator having in combination a substantially rectangular chamber, a plurality of rows of superposed spaced egg containing trays located along a pair of opposite sides of said chamber leaving an open corridor at the central portion of the chamber from front to rear thereof, said chamber having air inlet openings in said pair of opposite side walls and a plurality of large slow moving agitator fans in said chamber mounted between the rows of trays and the adjacent side walls, said chamber having openings therein permitting the exhaust of air from said chamber, said fans adjacent one of said side walls coacting with the fans adjacent the opposite side wall of said chamber to constantly agitate and mix the air at all points in the chamber.

In testimony whereof I affix my signature.

EARL H. SNOW.